(12) United States Patent
Nakagawa et al.

(10) Patent No.: US 10,095,241 B2
(45) Date of Patent: Oct. 9, 2018

(54) PARALLEL TRAVEL WORK SYSTEM

(71) Applicant: YANMAR CO., LTD., Osaka-shi, Osaka (JP)

(72) Inventors: Wataru Nakagawa, Osaka (JP); Kazuhisa Yokoyama, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 15/321,566

(22) PCT Filed: Jun. 25, 2015

(86) PCT No.: PCT/JP2015/068349
§ 371 (c)(1),
(2) Date: Dec. 22, 2016

(87) PCT Pub. No.: WO2016/002623
PCT Pub. Date: Jan. 7, 2016

(65) Prior Publication Data
US 2017/0160748 A1    Jun. 8, 2017

(30) Foreign Application Priority Data

Jun. 30, 2014  (JP) ................................. 2014-135332
Jul. 9, 2014  (JP) ................................. 2014-141536

(51) Int. Cl.
*B60T 7/18*    (2006.01)
*G05D 1/02*    (2006.01)
(Continued)

(52) U.S. Cl.
CPC ......... *G05D 1/0293* (2013.01); *A01B 69/008* (2013.01); *B60Q 5/005* (2013.01); *G05D 1/0278* (2013.01); *G05D 2201/0201* (2013.01)

(58) Field of Classification Search
CPC ........ G05D 1/0293; B60W 30/10; B60T 7/18; A01B 69/007; A01B 79/005; G08G 1/166
See application file for complete search history.

(56) References Cited

U.S. PATENT DOCUMENTS 6,148,255 A    11/2000  van der Lely
8,046,139 B2    10/2011  Diekhans et al.
(Continued)

FOREIGN PATENT DOCUMENTS

JP    H05-158537 A    6/1993
JP    H06-141605 A    5/1994
(Continued)

*Primary Examiner* — Yuri Kan
(74) *Attorney, Agent, or Firm* — Norton Rose Fulbright US LLP

(57) ABSTRACT

The purpose of the present invention is to enable a parallel work by a first work vehicle and a second work vehicle to be achieved while measuring the locations of the work vehicles utilizing cheaper satellite location measurement systems. A first satellite location measurement system is mounted on one of a first work vehicle and a second work vehicle, a second satellite location measurement system, which has lower accuracy than that of the first satellite location measurement system, is mounted on a remote control device to be carried on the other of the work vehicles, the actual locations of the first work vehicle and the second work vehicle are measured by the first satellite location measurement system and the second satellite location measurement system, and the locations of the first work vehicle and the second work vehicle are displayed on a display device in the remote control device.

4 Claims, 8 Drawing Sheets

(51) Int. Cl.
    *A01B 69/04*     (2006.01)
    *B60Q 5/00*     (2006.01)

(56) References Cited

U.S. PATENT DOCUMENTS

| | | |
|---|---|---|
| 8,738,238 B2 | 5/2014 | Rekow |
| 9,164,513 B2 | 10/2015 | Matsuzaki et al. |
| 2005/0015189 A1* | 1/2005 | Posselius ............ A01B 79/005     701/50 |
| 2006/0047418 A1* | 3/2006 | Metzler ............... A01B 69/007     701/469 |
| 2007/0035416 A1* | 2/2007 | Tanaka ..................... B60T 7/18     340/906 |
| 2007/0233348 A1 | 10/2007 | Diekhans et al. |
| 2011/0112730 A1 | 5/2011 | Rekow |
| 2014/0257619 A1 | 9/2014 | Rekow |
| 2014/0277899 A1 | 9/2014 | Matsuzaki et al. |
| 2015/0112509 A1* | 4/2015 | Fujita ..................... G08G 1/166     701/1 |
| 2017/0082452 A1* | 3/2017 | Sumizawa ............ B60W 30/10 |

FOREIGN PATENT DOCUMENTS

| | | |
|---|---|---|
| JP | H11-39036 A | 2/1999 |
| JP | 2001-507843 A | 6/2001 |
| JP | 2014-178759 A | 9/2014 |

\* cited by examiner

PARALLEL TRAVEL WORK SYSTEM

CROSS-REFERENCE TO RELATED APPLICATIONS

This is a national phase application based on the PCT International Patent Application No. PCT/JP2015/068349 filed Jun. 25, 2015, claiming priority to Japanese Patent Application Nos. 2014-135332 and 2014-141536 filed Jun. 30, 2014 and Jul. 9, 2014 respectively, the entire contents of all of which are incorporated herein by reference.

TECHNICAL FIELD

The present invention relates to a parallel travel work system in which a first work vehicle and a second work vehicle travel in parallel and work, and an art which enables work while maintaining a distance between the first work vehicle and the second work vehicle suitably.

BACKGROUND ART

Conventionally, a master vehicle is operated by an operator, a slave vehicle is an unmanned vehicle, the master vehicle and the slave vehicle have respectively control devices, the vehicles can be communicated with each other by radio, and a program is provided which enables the slave vehicle to travel in parallel to the master vehicle. An art in which the master vehicle and the slave vehicle have distance measurement devices and a distance between the master vehicle and the slave vehicle is adjusted to a predetermined distance.

An art in which a master vehicle and/or a slave vehicle have navigation devices such as GPS and positions of the master vehicle and/or the slave vehicle can be limited is known (for example, see the Patent Literature 1).

PRIOR ART REFERENCE

Patent Literature

Patent Literature 1: the Japanese Patent Laid Open Gazette 2001-507843

DISCLOSURE OF INVENTION

Problems to be Solved by the Invention

In the art, concerning the navigation devices mounted on the master vehicle and the slave vehicle, when navigation devices with high accuracy of positioning are mounted on both the vehicles, cost is increased. When the accuracy of positioning is reduced, the cost can be reduced, but an error is increased and unmanned travel becomes difficult.

The present invention is provided in consideration of the conditions as mentioned above, and one of first and second work vehicles has a positioning system with high accuracy and the other work vehicle has a positioning system with low accuracy in a portable remote control device so as to find positional relation between the first and second work vehicles with a flexible positioning system which is as cheap as possible.

Means for Solving the Problems

The problems to be solved by the present invention have been described above, and subsequently, the means of solving the problems will be described below.

According to the present invention, in a parallel travel work system in which a first satellite positioning system is mounted on one of a first work vehicle and a second work vehicle, a second satellite positioning system with lower accuracy than the first satellite positioning system is mounted on a remote control device carried into the other work vehicle, and work is performed while the first work vehicle and the second work vehicle travel in parallel, actual positions of the first work vehicle and the second work vehicle are positioned by the first satellite positioning system and the second satellite positioning system, the work and travel are performed while a separation distance is made within a set range, and the positions of the first work vehicle and the second work vehicle are displayed on a display device of the remote control device.

According to the present invention, a control device of the remote control device calculates a distance between the first work vehicle and the second work vehicle and gives an alarm when the distance is not more than a set distance.

According to the present invention, the control device of the remote control device calculates the distance between the first work vehicle and the second work vehicle and gives an alarm when the distance is not less than a set distance.

Effect of the Invention

According to the above means, the positioning system of the manned vehicle can be configured by a cheap positioning system.

DETAILED DESCRIPTION OF THE INVENTION

A parallel travel work system in which a precedence first work vehicle and a second work vehicle traveling behind (or beside) the first work vehicle travel in parallel and reciprocally along a set traveling route in a field is explained.

Firstly, an embodiment in which the first work vehicle is an autonomous moving work vehicle 1 which can travel automatically unmannedly, the second work vehicle is a manned auxiliary moving work vehicle 100 operated and steered by an operator so as to travel following the autonomous moving work vehicle 1, the autonomous moving work vehicle 1 and the auxiliary moving work vehicle 100 are tractors, and rotary tilling devices 24 and 224 are attached as work machines respectively to the autonomous moving work vehicle 1 and the auxiliary moving work vehicle 100 is explained. The work vehicles are not limited to the tractors and may alternatively be combines or the like. The work machines are not limited to the rotary tilling devices and may alternatively be furrowers, mowers, rakes, seeding machines, fertilizing machines, wagons or the like.

Figure 1:
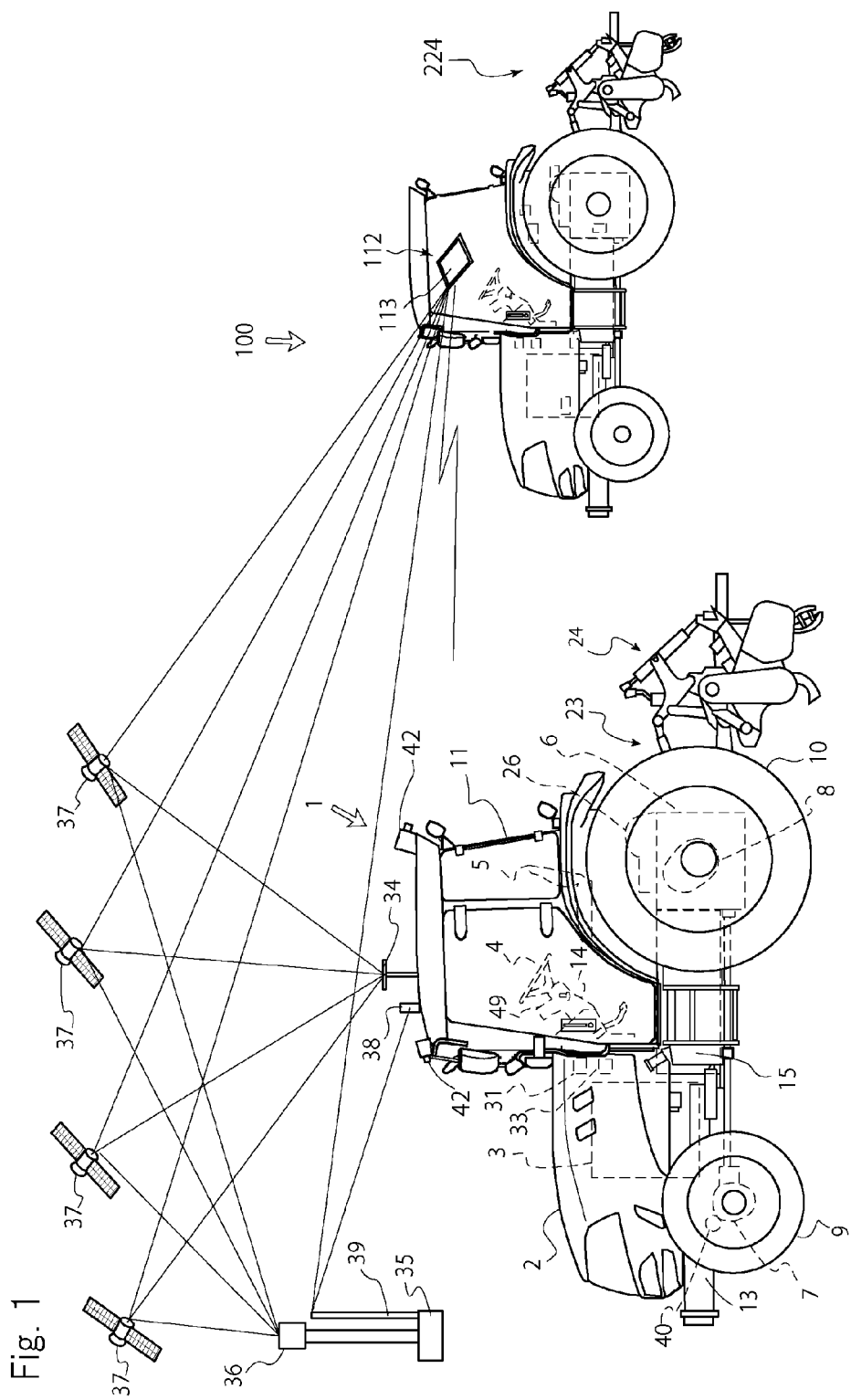
FIG. 1 is a schematic side view of an autonomous moving work vehicle, a GPS satellite and a reference station.
Figure 2:
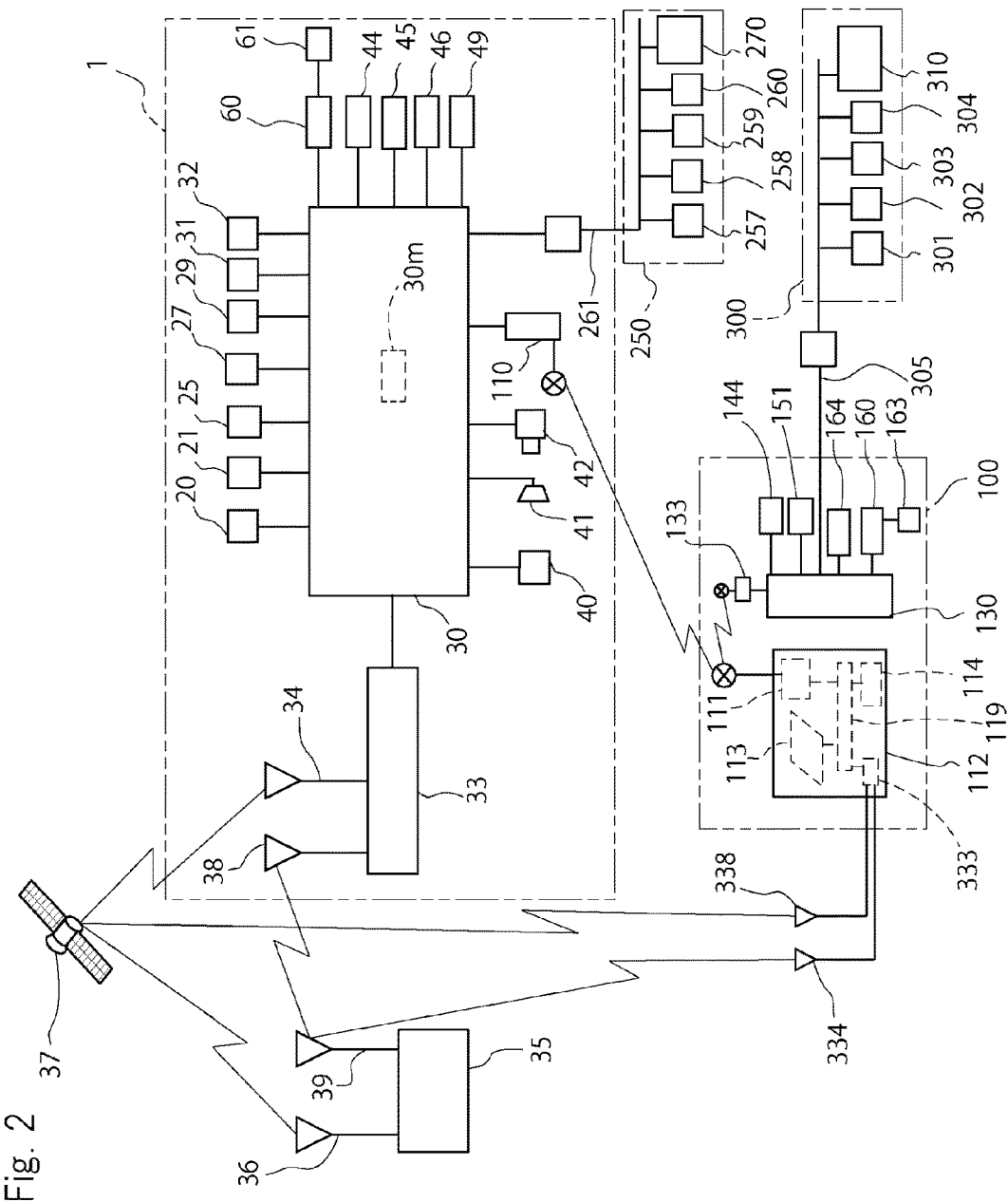
FIG. 2 is a control block diagram.

An entire configuration of the tractor which is the autonomous moving work vehicle 1 is explained referring to FIGS. 1 and 2. Since the first work vehicle (the autonomous moving work vehicle 1) and the second work vehicle (the auxiliary moving work vehicle 100) have substantially the same configuration, an explanation of the second work vehicle is omitted. An engine 3 is provided in a bonnet 2, a dashboard 14 is provided in a cabin 11 behind the bonnet 2, and a steering wheel 4 which is a steering operation means is provided on the dashboard 14. By rotating the steering wheel 4, a direction of front wheels 9 is rotated via a steering device. A steering direction of the autonomous moving work vehicle 1 is detected by a steering sensor 20. The steering sensor 20 includes an angle sensor such as a rotary encoder and arranged at a rotation base of the front wheels 9. A detection configuration of the steering sensor 20 is not limited and any configuration which recognizes the steering direction may be used. Rotation of the steering wheel 4 may be recognized, or an operation amount of power steering may be recognized. A detection value obtained by the steering sensor 20 is inputted into a control device 30. The control device 30 has a CPU (central processing unit), a storage device 30m such as a RAM or a ROM, an interface and the like, and programs, data and the like for operating the autonomous moving work vehicle 1 are stored in the storage device 30m.

A seat 5 is disposed behind the steering wheel 4, and a transmission casing 6 is arranged below the seat 5. At left aid right sides of the transmission casing 6, rear axle casings 8 are provided continuously, and rear wheels 10 are supported via axles by the rear axle casings 8. Power from the engine 3 is changed in speed by a transmission (a main transmission and a sub transmission) in the transmission casing 6 and can drive the rear wheels 10. For example, the transmission includes a hydraulic stepless transmission, and a movable swash plate of a variable capacity hydraulic pump is operated by a speed change means 44 such as a motor so as to perform the speed change. The speed change means 44 is connected to the control device 30. A rotation speed of the rear wheels 10 is detected by a vehicle speed sensor 27 as a traveling speed detection means, and inputted into the control device 30 as a traveling speed. A detection method of the traveling speed and an arrangement position of the vehicle speed sensor 27 are not limited.

A brake device 46 is provided in the rear axle casings 8 and connected to the control device 30 so as to perform brake control.

A PTO clutch and a PTO transmission are housed in the transmission casing 6. The PTO clutch is engaged and disengaged by a PTO switching means 45. The PTO switching means 45 is connected to the control device 30 so as to control connection and disconnection of power transmission to a PTO shaft.

A front axle casing 7 is supported by a front frame 13 supporting the engine 3 and the front wheels 9 are supported at both sides of the front axle casing 7 so that power from the transmission casing 6 can be transmitted to the front wheels 9. The front wheels 9 are steering wheels and turned by rotation operation of the steering wheel 4, and the front wheels 9 can be steered laterally by a steering actuator 40 including a power steering cylinder which is a driving means of a steering device. The steering actuator 40 is connected to the control device 30 and controlled and driven by an automatic traveling means.

An engine controller 60 which is an engine rotation control means is connected to the control device 30, and an engine rotation speed sensor 61, a water temperature sensor, a hydraulic pressure sensor and the like are connected to the engine controller 60 so as to detect a state of the engine. The engine controller 60 can detect a load from a set rotation speed and an actual rotation speed and perform control so as to prevent overload, and can transmit the state of the engine 3 to a remote control device 112 discussed later so as to display the state of the engine 3 on a display 113.

In a fuel tank 15 below a step, a level sensor 29 detecting a level of fuel is arranged and connected to the control device 30. In a display means 49 provided in the dashboard of the autonomous moving work vehicle 1, a fuel gauge displaying residual amount of fuel is provided and connected to the control device 30. Information about the fuel residual amount is transmitted from the control device 30 to the remote control device 112, and the fuel residual amount and workable time are displayed on the display 113 of the remote control device 112.

On the dashboard 14, the display means 49 displaying a rotation meter of the engine, the fuel gauge, a monitor displaying hydraulic pressure and abnormality, a set value and the like are arranged.

The rotary tilling device 24 is provided movably vertically as the work machine behind a vehicle body of the tractor via a work machine attachment device 23 so as to perform tilling work. A lifting cylinder 26 is provided on the transmission casing 6, and by extending and contracting the lifting cylinder 26, a lifting arm constituting the work machine attachment device 23 is rotated so as to move the rotary tilling device 24 vertically. The lifting cylinder 26 is extended and contracted by a lifting actuator 25, and the lifting actuator 25 is connected to the control device 30. In the lifting arm of the work machine attachment device 23, an angle sensor 21 is provided as a means for detecting a lifting position so as to detect a lifting height of the work machine, and the angle sensor 21 is connected to the control device 30.

An obstacle sensor 41 is arranged in the autonomously moving work vehicle 1 and connected to the control device 30 so as to prevent contact with the obstacle. For example, the obstacle sensor 41 includes a laser sensor or an ultrasonic sensor, arranged at front, side or rear part of the vehicle body and connected to the control device 30, and detects whether an obstacle exists before, beside or behind the vehicle body and stops the traveling when the obstacle approaches within a set distance.

In the autonomously moving work vehicle 1, the camera 42 photting a front side, a rear side and the work machine is mounted and connected to the control device 30. An image photted by the camera 42 is displayed on the display 113 of the remote control device 112 provided in an auxiliary moving work vehicle 100. When a display screen of the display 113 is small, the image may be displayed by another large display, or the camera image may be displayed always or alternatively by another display of exclusive use or displayed by the display means 49 provided in the autonomously moving work vehicle 1. The camera 42 may be configured so that one camera 42 is arranged at a center of the vehicle body and turned around a vertical axis so as to photo the circumference or that a plurality of cameras 42 are arranged at front and rear sides or four corners of the vehicle body so as to photo the circumference, and the configuration is not limited.

An operator rides on and operates the auxiliary moving work vehicle 100, and the remote control device 112 is mounted on the auxiliary moving work vehicle 100 so as to operate the autonomously moving work vehicle 1. An explanation of a basic configuration of the auxiliary moving work vehicle 100 is omitted because it is substantially the same as the autonomously moving work vehicle 1.

The remote control device 112 sets the traveling route R of the autonomously moving work vehicle 1, controls the autonomously moving work vehicle 1 remotely, supervises traveling state of the autonomously moving work vehicle 1 and operation state of the work machine, and stores work data. For example, by operating the remote control device 112, sudden stop, temporary stop, restart, speed change, change of engine rotation speed, vertical movement of the work machine, engagement and disengagement of the PTO clutch and the like of the autonomously moving work vehicle 1 can be operated. Namely, an accelerator actuator, the speed change means 44, the PTO switching means 45, the brake device 46 and the like are controlled by the remote control device 112 via the communication device 111, the communication device 110 and the control device 30 so that an operator can operate the autonomously moving work vehicle 1 remotely easily.

The remote control device 112 can be attached to and detached from an operation part such as a dashboard of the auxiliary moving work vehicle 100 and the autonomously moving work vehicle 1. The remote control device 112 can be operated while being attached to the dashboard of the auxiliary moving work vehicle 100, can be taken out from the auxiliary moving work vehicle 100 and operated while being carried, or can be operated while being attached to the dashboard of the autonomously moving work vehicle 1. For example, the remote control device 112 can be configured by a note-type or tablet-type personal computer. In this embodiment, a tablet-type personal computer is used.

Furthermore, the remote control device 112 and the autonomously moving work vehicle 1 can be communicated with each other on radio, and communication devices 110 and 111 for the communication are provided respectively in the autonomously moving work vehicle 1 and the remote control device 112. The communication device 111 is configured integrally with the remote control device 112. For example, the communication means can be communicated with each other by wireless LAN such as WiFi. In a surface of a casing of the remote control device 112, the display 113 which is a touch panel-type operation screen which can be operated by touching the screen is provided, and the communication device 111, a CPU and a storage device as a control device 119, a battery and the like are housed in the casing. An image of the surrounding photted by the camera 42, state of the autonomously moving work vehicle 1, state of work, information about the GPS, the operation screen and the like can be displayed on the display 113 so as to be supervised by an operator.

Position information of the autonomous moving work vehicle 1 and the auxiliary moving work vehicle 100 is obtained by the GPS (global positioning system).

The GPS is a system developed originally for navigation support of an airplane, a ship and the like, and includes twenty four GPS satellites (four satellites in each of six raceway surfaces) going around at an altitude of about 20,000 km, a control station pursuing and controlling the GPS satellites, and a communication device of an user for positioning. In addition to a OPS satellite (America), by using a global navigation satellite system (GNSS) such as a quasi-zenith satellite (Japan) and a GLONASS satellite (Russia), more accurate positioning can be performed. However, this embodiment is explained with the GPS satellite.

As a positioning method using the GPS, various methods such as independent positioning, relative positioning. DGPS (differential GPS) positioning and RTK-GPS (real time kinematic GPS) positioning are mentioned, and either of these methods can be used. In this embodiment, a RTK-GPS positioning method (first satellite positioning system) with high accuracy is adopted for the autonomously moving work vehicle 1 which is the first work vehicle so as to position an actual position. An operator having the remote control device 112 rides on the auxiliary moving work vehicle 100 which is the second work vehicle, and the DGPS positioning (second satellite positioning system) with lower accuracy than the first satellite positioning system is adopted for the remote control device 112 so as to position an actual position. The DGPS positioning method has lower accuracy than the RTK-GPS positioning method, but enough for detecting a relative distance between the autonomously moving work vehicle 1 and the auxiliary moving work vehicle 100 and cheap, thereby enabling to detect the relative distance between the remote control device 112 and the autonomously moving work vehicle 1. By displaying the relative distance between the autonomously moving work vehicle 1 and the auxiliary moving work vehicle 100 by the display 113 while operating the remote control device 112, an operator can grasp easily the relative distance, whereby excessive approach and excessive separation can be recognized easily.

Since the autonomously moving work vehicle 1 is operated automatically, positioning thereof is performed as accurately as possible and the autonomously moving work vehicle 1 travels based on accurate position information so as to make an error as small as possible, whereby loss is reduced and the work can be performed efficiently. On the other hand, since the auxiliary moving work vehicle 100 which travels behind aslant the autonomously moving work vehicle 1 and on which an operator rides travels and works along an traveling process of the autonomously moving work vehicle 1, the operator can correct a few gap even when positioning accuracy is low. The second satellite positioning system may alternatively be an independent positioning system which is cheaper than the first satellite positioning system and can position separation distance of the first work vehicle and the second work vehicle to some extent. The first satellite positioning system should just be a positioning system with high accuracy such as the RTK-GPS positioning and is not limited.

A method of the RTK-GPS positioning is explained referring to FIGS. 1 and 2.

The RTK-GPS (real time kinematic GPS) positioning is a method that GPS observation is performed simultaneously at a reference station whose position is known and a mobile station whose position is to be found, data observed at the reference station is transmitted to the mobile station on real time by a method such as wireless communication, and the position of the mobile station is found on real time based on positional results of the reference station.

In this embodiment, the mobile communication device 33, the mobile GPS antenna 34 and the data reception antenna 38 constituting the mobile station are arranged on the cabin 11 of the autonomously moving work vehicle 1, and a fixed communication device 35, a fixed GPS antenna 36 and a data transmission antenna 39 constituting the reference station are disposed at a predetermined position not being obstacle of work in the field. In the RTK-GPS (real time kinematic GPS) positioning of this embodiment, measurement of a phase (relative positioning) is performed at both the reference station and the mobile station, and data positioned by the fixed communication device 35 of the reference station is transmitted from the data transmission antenna 39 to the data reception antenna 38.

The mobile GPS antenna 34 arranged in the autonomously moving work vehicle 1 receives signals from GPS satellites 37. The signals are transmitted to the mobile communication device 33 and positioned. Simultaneously, the signals from GPS satellites 37 are received by the fixed OPS antenna 36 which is the reference station, positioned by the fixed communication device 35 and transmitted to the mobile communication device 33, and the measured data are analyzed so as to determine the position of the mobile station. The position information obtained as the above is transmitted to the control device 30.

Accordingly, the control device 30 of the autonomously moving work vehicle 1 has an automatic traveling means traveling automatically. The automatic traveling means receives electric waves transmitted from the GPS satellites 37, finds the position information of the vehicle body at set time intervals in the mobile communication device 33, and finds displacement information and azimuth information of the vehicle body from the gyro sensor 31 and the azimuth sensor 32, and controls the steering actuator 40, the speed change means 44, the lifting actuator 25, the PTO switching means 45, the engine controller 60 and the like so as to make the vehicle body travel along a set route set previously based on the position information and the azimuth information, thereby working automatically. Position information of an outer perimeter of a field H which is a work range (map information) is set previously by a known method and stored in the storage device 30m.

In the DGPS positioning, independent positioning is performed at each of the mobile station and the reference station, a positioning error is found in the reference station, and correction information is received by the mobile station so as to perform correction processing on real time. In this embodiment, in the remote control device 112, a mobile communication device 333, a mobile GPS antenna 334 and a data reception antenna 338 are provided, and the correction information generated in the reference station is received by the remote control device 112 via the data reception antenna 38, whereby the position is found.

The position of the remote control device 112 and the position of the autonomously moving work vehicle 1 are displayed by the display 113 and the display means 49, and the separation distance thereof is calculated and displayed by the display 113 and the display means 49. Accordingly, the relative position of the autonomously moving work vehicle 1 and the auxiliary moving work vehicle 100 can be recognized easily. An alarm device such as a buzzer or a speaker 151 is provided in the remote control device 112 or the auxiliary moving work vehicle 100 and connected to control devices 119 and 130. Furthermore, the separation distance of the autonomously moving work vehicle 1 and the auxiliary moving work vehicle 100 is compared with a maximum separation set distance and a minimum separation set distance, and an alarm is given when the separation distance is longer than the maximum separation set distance and an alarm is given when the separation distance is shorter than the minimum separation set distance, whereby the work can be performed while traveling with the separation distance within a set range.

The alarms give difference alarm sound or voice so that the case that the separation distance is longer than the maximum separation set distance and the case that the separation distance is shorter than the minimum separation set distance can be recognized, whereby an operator can recognize excessive approach and excessive separation easily. It may alternatively be configured that as close or far as the vehicles become, as large as the sound becomes or as short as the sound which is intermittent becomes. The maximum separation set distance is a distance in which a work state of the precedence autonomously moving work vehicle 1 can be checked by looking from the auxiliary moving work vehicle 100 certainly or can be checked by looking by an operator without changing a field of view widely. For example, the minimum separation set distance is a distance in which a rear end of the precedence autonomously moving work vehicle 1 and a front end of the following auxiliary moving work vehicle 100 is substantially in agreement with each other, or a distance in which when load of the autonomously moving work vehicle 1 is increased and rotation speed thereof is reduced, the auxiliary moving work vehicle 100 cannot catch up with the autonomously moving work vehicle 1 so as to prevent collision. The maximum separation set distance and the minimum separation set distance can be changed easily by the remote control device 112 or the like.

Though the second satellite positioning system (DGPS positioning method) is mounted on the remote control device 112, it may alternatively be mounted on the auxiliary moving work vehicle 100 which is the second work vehicle for the positioning. Though the first work vehicle is unmanned and the second work vehicle is manned, it may alternatively be configured that the first work vehicle is manned and performs the positioning by the second satellite positioning system (DGPS positioning method) with lower accuracy than the first satellite positioning system, and the second work vehicle is unmanned and performs the positioning by the first satellite positioning system (RTK-GPS positioning method).

Figure 3:
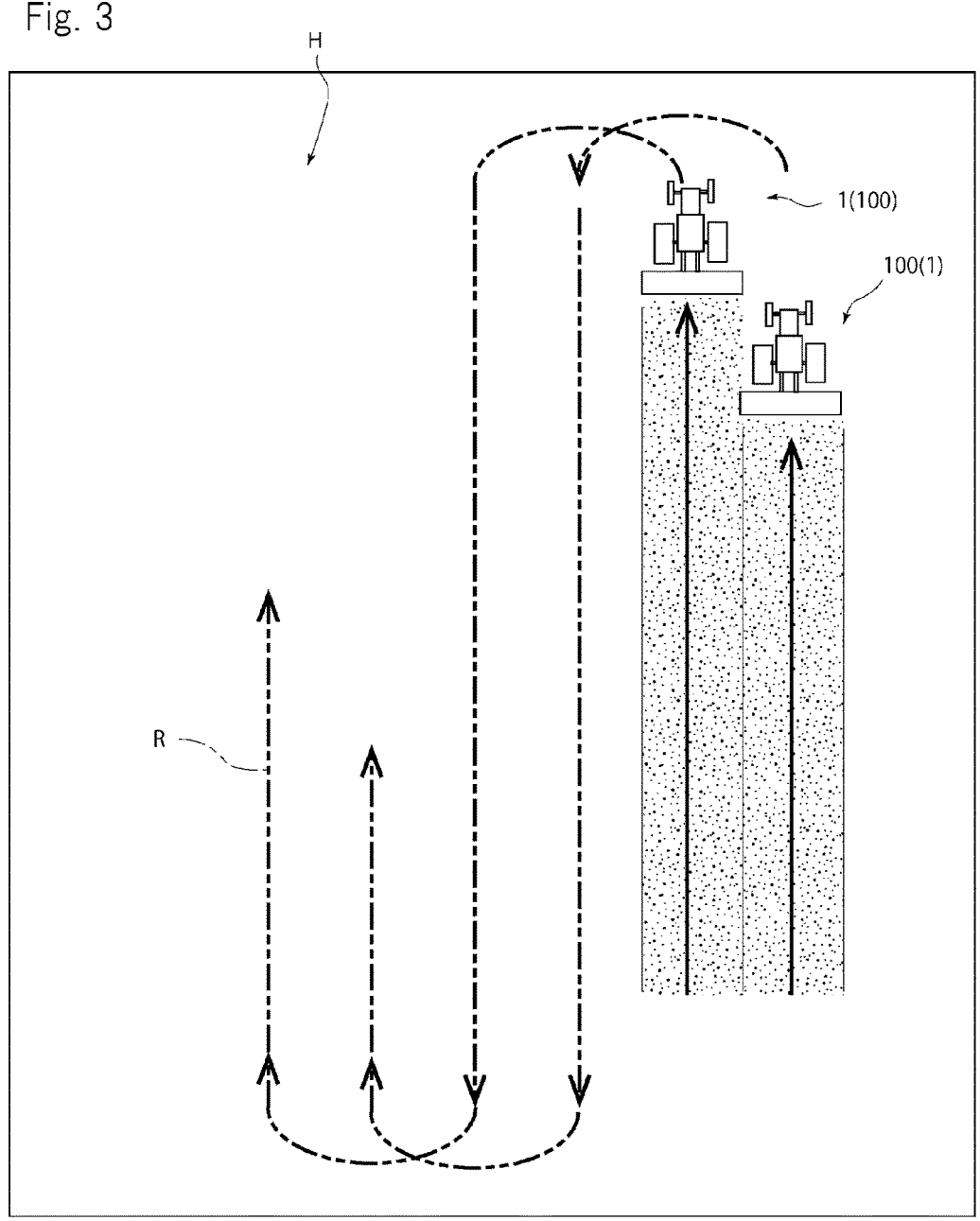
FIG. 3 is a drawing of the state of parallel traveling work traveling while being aligned aslant in a longitudinal direction.

Namely, the first work vehicle and/or the second work vehicle travel along the set traveling route R, and as shown in FIG. 3, the first work vehicle and the second work vehicle travel in parallel aslant in longitudinal and lateral directions (or beside) to each other and perform the work. The distance between the first work vehicle and the second work vehicle is calculated from the positions thereof positioned by the satellite positioning system. When the first work vehicle is the unmanned autonomously moving work vehicle 1 and the second work vehicle is the manned auxiliary moving work vehicle 100, as mentioned above, the first work vehicle is positioned by the RTK-GPS positioning method and the second work vehicle is positioned by the DGPS positioning method with lower accuracy so that the separation distance of the first work vehicle and the second work vehicle is calculated, and the control device 30 of the autonomously moving work vehicle 1 controls the speed change means 44 so as to make the separation distance within the set range. Otherwise, an operator riding on the second work vehicle operates a speed change device of the second work vehicle while locking the separation distance displayed by the display 113 so as to make the separation distance within the set range. In this case, when the separation distance excesses the maximum separation set distance or becomes less than the minimum separation set distance, the alarm is given, whereby the operator can recognize it and change speed. The control device 130 of the auxiliary moving work vehicle 100 which is the second work vehicle operates a speed change means 144 so as to make the separation distance within the set range.

When the first work vehicle and the second work vehicle are arranged as FIG. 3 and the first work vehicle is manned and the second work vehicle is unmanned, the first work vehicle is positioned by the DGPS positioning method and the second work vehicle is positioned by the RTK-GPS positioning method, and the separation distance of the first work vehicle and the second work vehicle is calculated and the control device 30 of the second work vehicle controls the speed change means 44 so as to make the separation distance within the set range. When the separation distance excesses the set range, the speed is increased, and when the separation distance becomes within the set distance, the speed is returned to the original work speed. When the separation distance becomes less than the set range, the speed is reduced, and when the separation distance becomes within the set distance, the speed is returned to the original work speed.

When the first work vehicle and the second work vehicle are unmanned, the first work vehicle and the second work vehicle are positioned by the RTK-GPS positioning method, and the separation distance of the first work vehicle and the second work vehicle is calculated and the control device 30 or 130 of the first work vehicle or the second work vehicle controls corresponding one of the speed change means 44 or 144 so as to make the separation distance within the set range.

Figure 4:
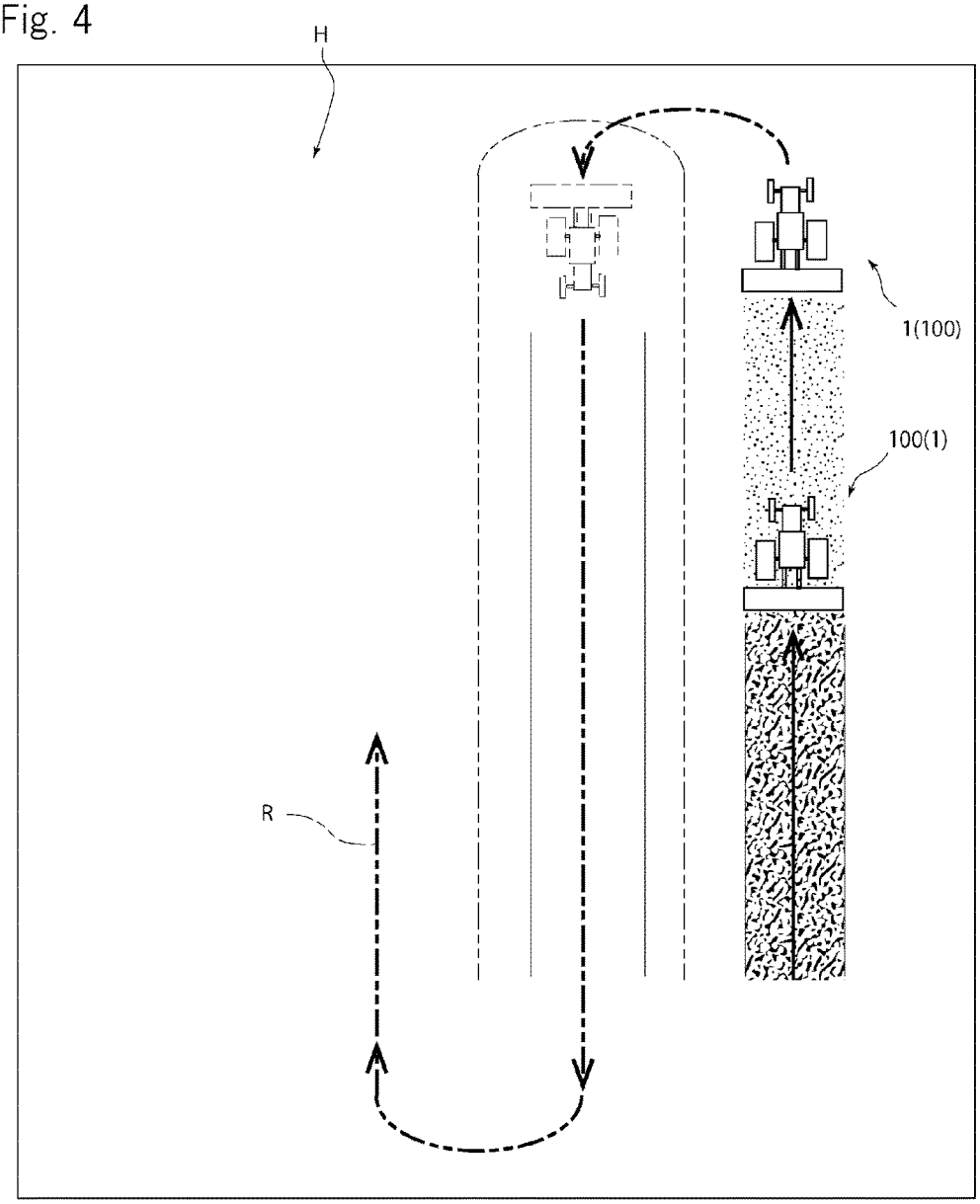
FIG. 4 is a drawing of the state of parallel traveling work traveling while being aligned in a longitudinal direction.

In the case of the work of FIG. 3, the first work vehicle and the second work vehicle perform the same work and works twice width at once. In the case in which the first work vehicle and the second work vehicle are aligned longitudinally and perform different works as shown in FIG. 4, the control is performed the same as the above.

Figure 5:
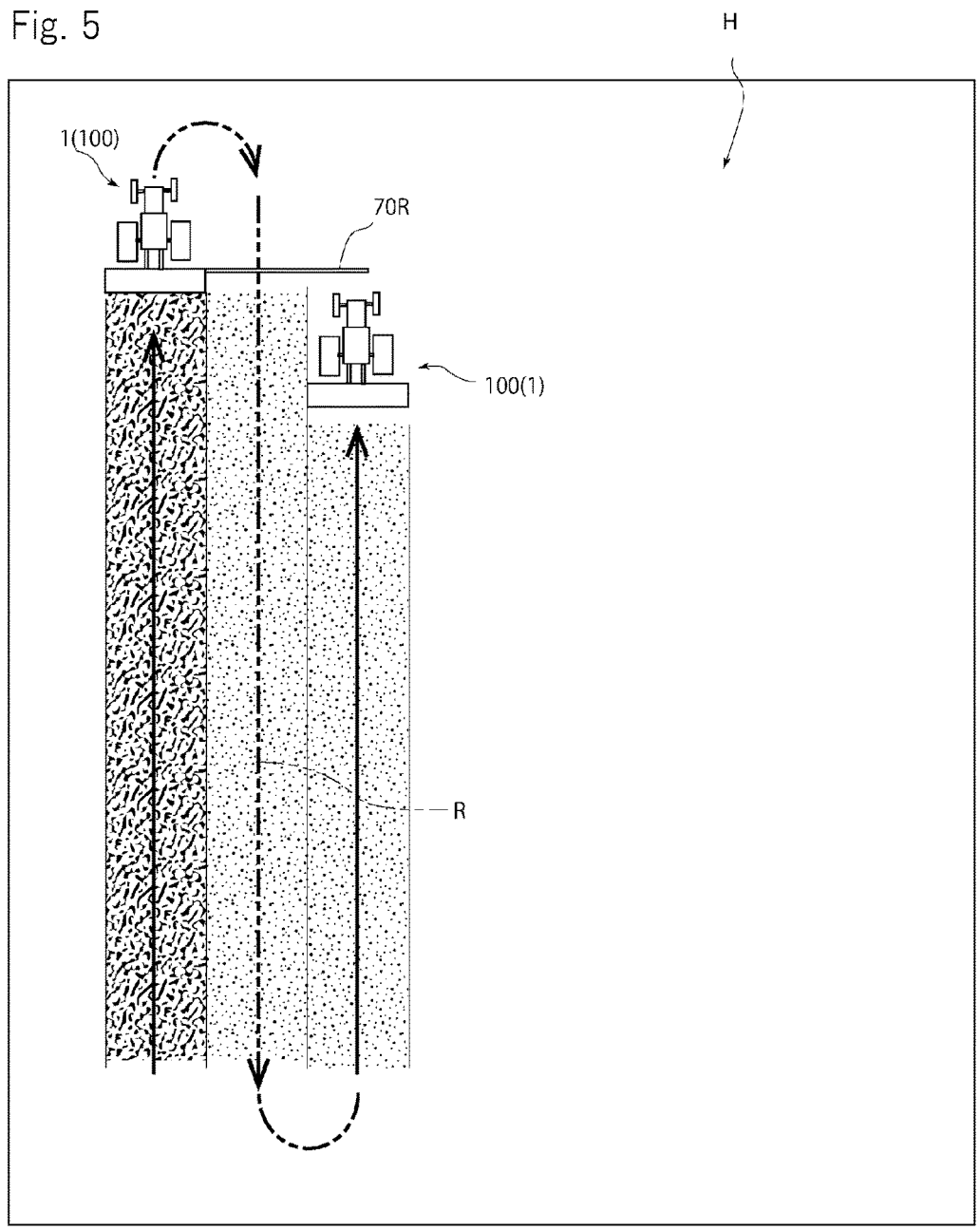
FIG. 5 is a drawing of the state in which work is performed while a manned work vehicle travels before an unmanned work vehicle.

In the above embodiment, the position of the precedence autonomously moving work vehicle 1 is positioned by the RTK-GPS positioning method which is the first satellite positioning system and the position of the following auxiliary moving work vehicle 100 is positioned by the DGPS positioning method which is the second satellite positioning system. However, the control can be applied to the case in which the auxiliary moving work vehicle 100 travels in a former process and the autonomously moving work vehicle 1 travels in a latter process as shown in FIG. 5.

The present invention is not limited to the above embodiment. The present invention can be applied to the case in which the first work vehicle is a unmanned tractor and the second work vehicle is a manned tractor, the case in which the first work vehicle is a manned tractor and the second work vehicle is a unmanned tractor, and the case in which both the first work vehicle and the second work vehicle are unmanned tractors.

Conventionally, as the art of the Japanese Patent Laid Open Gazette H6-141605, a controller of a tractor is connected to a suitable sensor detecting operation state of the tractor, a work machine attached to a rear part of the tractor is connected to a controller and an actuator driven by instruction of the controller, and both the controllers are connected via a communication line and work is performed. However, in the connection of the controller of the main body and the controller of the work machine via the communication line, the controllers of the one tractor are connected, and when the work is performed by a plurality of tractors, control is performed for each tractor. Then, when a set value is difference among the tractors, a uniform result cannot be obtained. In the case of the plurality of the tractors perform the work simultaneously, the tractors are not in cooperation mutually, and for changing the setting, it is necessary to stop all the tractors and to perform confirmation among them so as to make the set value the same.

Then, a parallel travel work system is provided in which in the case of the work in which a manned tractor and by a plurality of unmanned tractors travel in parallel and work, work states of the tractors are grasped mutually and the set values thereof are made the same so as to perform uniform work, and when a control amount of the one work machine, control amounts of the other work machines can be changed corresponding to the control amount of the one work machine.

Figure 6:
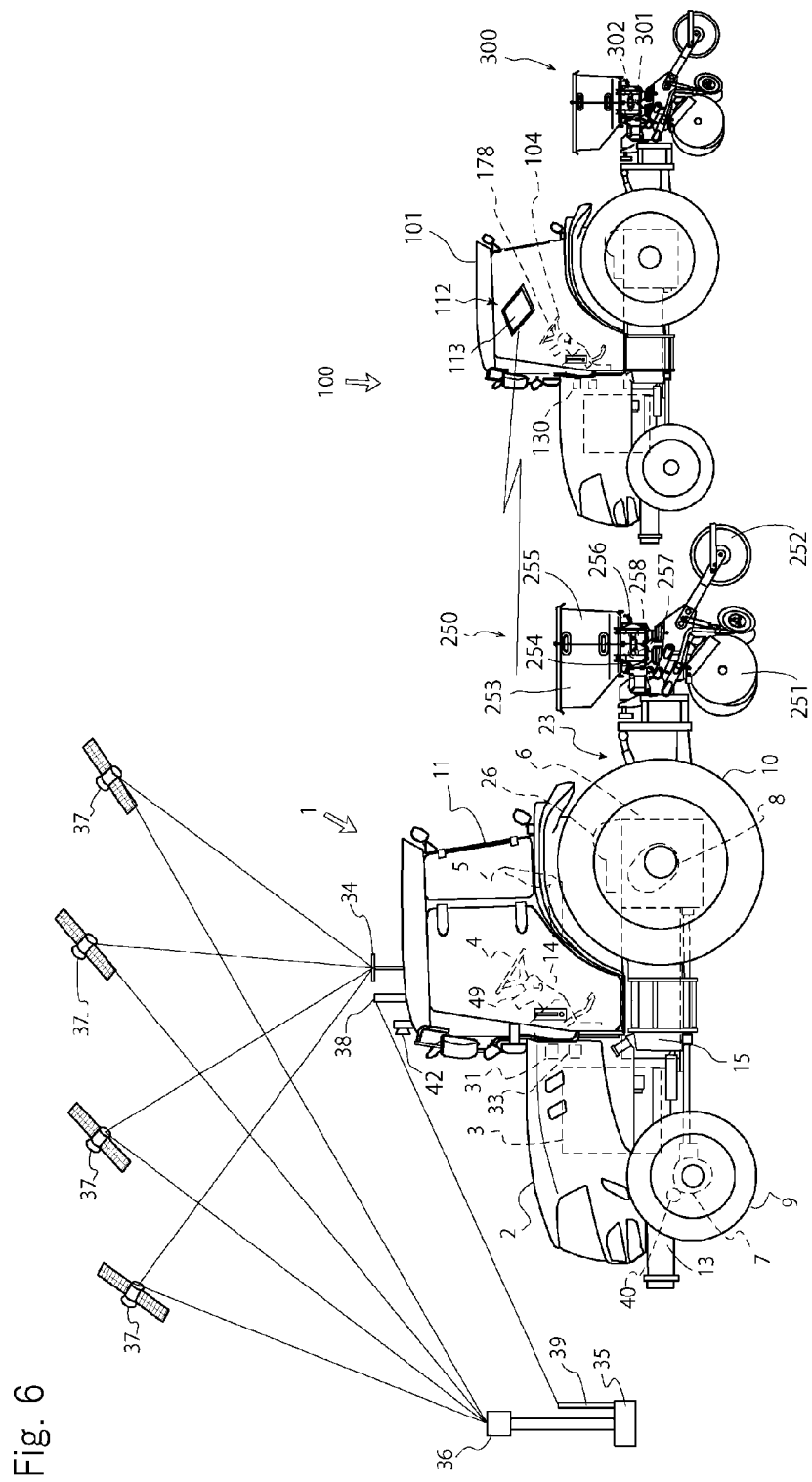
FIG. 6 is a drawing of the state in which fertilizing and seeding machines are attached respectively to a precedence autonomously moving work vehicle and a following auxiliary moving work vehicle and work is performed.

For example, as shown in FIG. 6, the case in which a fertilizing and seeding machine 250 is attached as the work machine of the autonomously moving work vehicle 1, and a fertilizing and seeding machine 300 is attached as the work machine of the auxiliary moving work vehicle 100 is explained.

The autonomously moving work vehicle 1 and the fertilizing and seeding machine 250 which is the work machine can be operated remotely by the remote control device 112. For example, by operating the remote control device 112, sudden stop, temporary stop, restart, change of traveling speed, change of engine rotation speed, vertical movement of the work machine, turning on and off of the PTO clutch, and the like of the autonomously moving work vehicle 1 can be operated. Furthermore, a set value of feed amount of the fertilizing and seeding machine 250 can be changed so as to adjust seeding amount and fertilization amount. Namely, an operator can control an accelerator actuator, the speed change means 44 and the PTO switching means 45 from the remote control device 112 via the communication device 111, the communication device 110 and the control device 30 so as to operate remotely the autonomously moving work vehicle 1 easily, whereby the fertilization amount and the seeding amount of the fertilizing and seeding machine 250 can be operated remotely. Amount of fertilizer in a fertilizer hopper 253 and amount of seedling in a seedling hopper 255 is detected by residual amount sensors 259 and 260, and when a detection amount is reduced for not less than a set value, the reduction can be displayed by the display 113 or an alarm can be given.

When the autonomously moving work vehicle 1 approaches an edge of the field and the traveling speed is reduced, a work machine controller 270 performs calculation so as to reduce the fertilization amount and the seeding amount corresponding to the speed, and feeding motors 257 and 258 are controlled. When the vehicle reaches the edge of the field from map information and the traveling route R, the feeding motors 257 and 258 are stopped, and when the vehicle turns and subsequently restarts traveling from a work restart position, the feeding motors 257 and 258 are driven and the feeding amount is controlled corresponding to the traveling speed.

The control device 130 is provided in the auxiliary moving work vehicle 100 and the control device 130 can be communicated with the remote control device 112. The control device 130 is connected to an engine controller 160 and a lifting actuator 164, and furthermore, similarly to the autonomously moving work vehicle 1, the control device 130 is connected to a work machine controller 310, feeding motors 301 and 302, and residual amount sensors 303 and 304 of the fertilizing and seeding machine 300 via a communication line 305, whereby data communication is enabled. Since the configuration and the control of the fertilizing and seeding machine 250 attached to the autonomously moving work vehicle 1 are substantially the same as those of the fertilizing and seeding machine 300 attached to the auxiliary moving work vehicle 100, an explanation thereof is omitted.

Accordingly in the case in which the autonomously moving work vehicle 1 and the auxiliary moving work vehicle 100 travel in parallel and perform the fertilizing and seeding work simultaneously, for example, when load of the autonomously moving work vehicle 1 is increased and the traveling speed is reduced, fertilizing and seeding amount must be reduced. At this time, when setting of the fertilizing and seeding amount is changed, the control devices 30 and 130 of the autonomously moving work vehicle and the auxiliary moving work vehicle can be communicated with each other by the communication device 110, 111, and 133 and the fertilizing and seeding machines 250 and 300 are connected respectively via the communication lines 305 and 261 to the control devices 30 and 130, whereby the traveling speed of the auxiliary moving work vehicle 100 can be reduced and fertilizing and seeding amount of the fertilizing and seeding machine 300 can be hanged simultaneously. Similarly, when the traveling speed of the autonomously moving work vehicle 1 is reduced, the traveling speed of the auxiliary moving work vehicle 100 and the fertilizing and seeding amount of the fertilizing and seeding machines 250 and 300 are adjusted. Accordingly, when change occurs in one of the fertilizing and seeding machines 250 and 300 of the autonomously moving work vehicle 1 and the auxiliary moving work vehicle 100, the other thereof can be changed simultaneously following the change. When the fertilizing and seeding amount of one of the fertilizing and seeding machines 250 and 300 is changed by the remote control device 112, the display means 49 or the like, the other thereof can be changed simultaneously following the change so as to perform uniform work.

As the above, in the manned auxiliary moving work vehicle 100, the control device 130 of the main body and the work machine controller 310 which is a control device of the fertilizing and seeding machine 300 which is the work machine are connected via the communication line 305, and in the unmanned autonomously moving work vehicle 1, the control device 30 of the main body and the work machine controller 270 which is a control device of the fertilizing and seeding machine 250 which is the work machine are connected via the communication line 261. The control device 30 of the autonomously moving work vehicle 1, the control device 130 of the auxiliary moving work vehicle 100 and the remote control device 112 mounted on the auxiliary moving work vehicle 100 are enabled to be communicated with each other by the communication device 110, 111, and 133. The feeding motors 257 and 258 which are actuators of the work machine of the autonomously moving work vehicle 1 are controlled following control of the feeding motors 301 and 302 which are actuators of the work machine of the auxiliary moving work vehicle 100. Accordingly, operability is improved.

The feeding motors 301 and 302 which are actuators of the fertilizing and seeding machine 300 of the auxiliary moving work vehicle 100 are controlled following control of the feeding motors 257 and 258 which are actuators provided in the fertilizing and seeding machine 250 of the autonomously moving work vehicle 1. Accordingly, operability is improved further than the case in which the feeding motors are operated separately.

Set values of the feeding motors 257 and 258 which are actuators provided in the fertilizing and seeding machine 250 of the autonomously moving work vehicle 1 and the feeding motors 301 and 302 which are actuators of the work machine of the auxiliary moving work vehicle 100 can be changed by the remote control device 112. Accordingly, the setting can be changed easily without stopping the traveling after starting the work.

Figure 7:
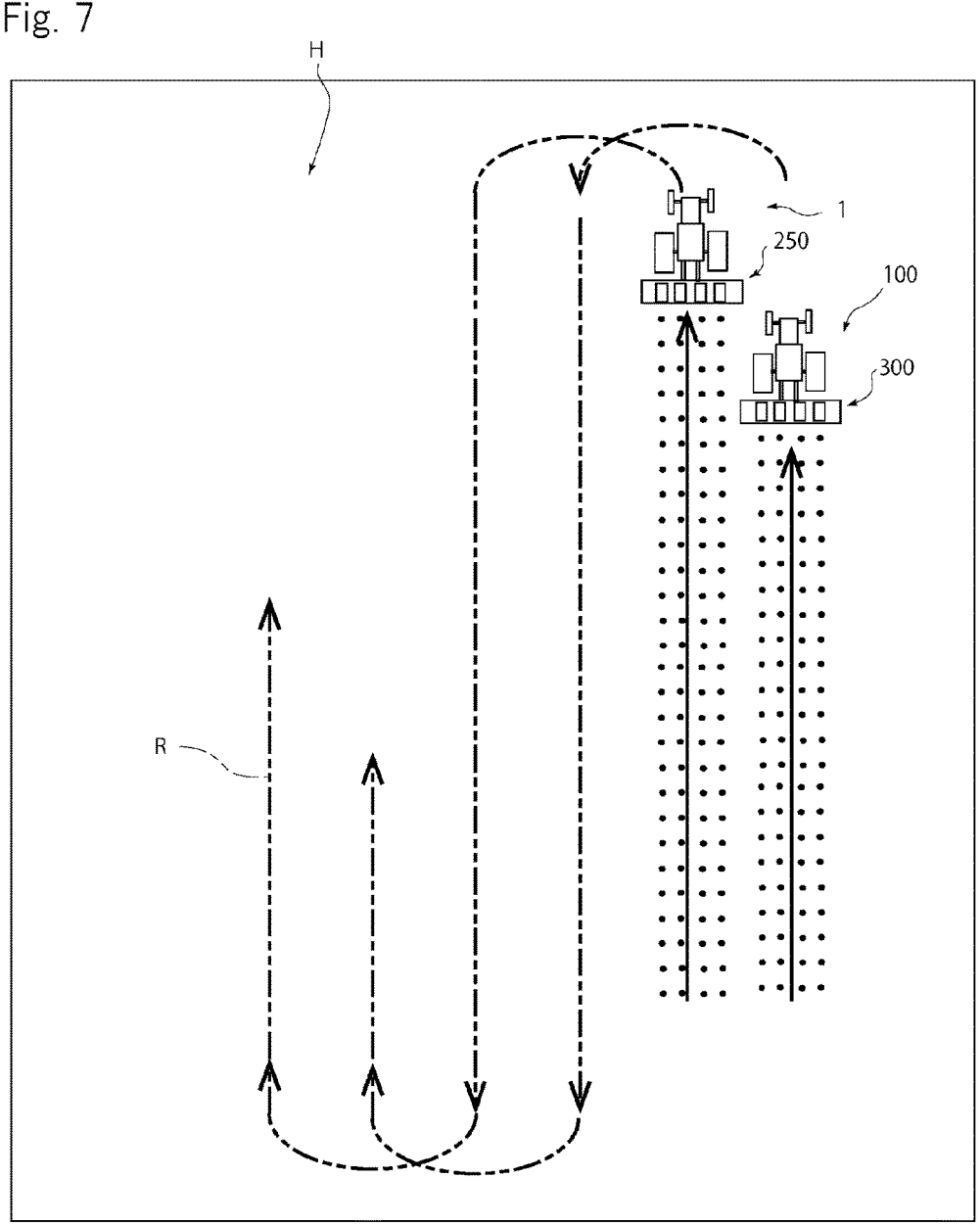
FIG. 7 is a drawing of the state of parallel traveling work in which a autonomously moving work vehicle and a auxiliary moving work vehicle travel while being aligned aslant in a longitudinal direction.

A concrete explanation is given. As shown in FIG. 7, the same work machines (the fertilizing and seeding machines 250 and 300) are attached respectively to the case in which the autonomously moving work vehicle 1 and the auxiliary moving work vehicle 100, the auxiliary moving work vehicle 100 travels behind aslant (beside in the lateral direction) the autonomously moving work vehicle 1, and the vehicles perform the same work while being aligned in the lateral direction so as to work in twice width at once. In the fertilizing and seeding work, each of the feeding motors 257, 258, 301 and 302 of the fertilizing and seeding machines 250 and 300 is controlled so that feed amount thereof is changed corresponding to the traveling speed of the autonomously moving work vehicle 1 and the auxiliary moving work vehicle 100.

Before starting the work by the autonomously moving work vehicle 1 and the auxiliary moving work vehicle 100, the feed amount per traveling distance of the fertilizing and seeding machines 250 and 300 is set by the remote control device 112. For example, when fertilizer feed amount of the fertilizing and seeding machine 250 of the autonomously moving work vehicle 1 is set, fertilizer feed amount of the fertilizing and seeding machine 300 of the auxiliary moving work vehicle 100 is set simultaneously. Seedling feed amount can be set similarly. Accordingly, for performing the same work in the same field, the feed amount of the fertilizing and seeding machines 250 and 300 of the autonomously moving work vehicle 1 and the auxiliary moving work vehicle 100 is the same so as to prevent dispersion. According to the above configuration, the feed amount of the fertilizing and seeding machines 250 and 300 can be set equal simultaneously by the remote control device 112 and mistake of the setting can be prevented. In the work, characteristics of soil may be changed in the large field. In this case, an operator can change the setting of the feed amount per the traveling distance by the remote control device 112 at a desired position so as to change the feed amount of the fertilizing and seeding machines 250 and 300 of the autonomously moving work vehicle 1 and the auxiliary moving work vehicle 100 simultaneously.

It may alternatively be configured that a mode selection switch is provided and the setting of the work machines of the autonomously moving work vehicle 1 and the auxiliary moving work vehicle 100 is changed separately. Operation devices of the fertilizing and seeding machines 250 and 300 are provided in main bodies of the autonomously moving work vehicle 1 and the auxiliary moving work vehicle 100 (for example, on dashboards) so that set values can be manually changed independently.

The parallel traveling work of the autonomously moving work vehicle 1 and the auxiliary moving work vehicle 100 may alternatively be configured so that different kinds of work is performed by different work machines, and one of the work machines is controlled interlockingly to control of the other work machine. For example, a rotary tilling device is attached to the autonomously moving work vehicle 1 and a seeding machine is attached to the auxiliary moving work vehicle 100, and a seedling depth adjustment actuator is provided in the seeding machine. In the work with these attachment, by programming that seedling depth is made shallow in the case in which the soil is hard and tilling depth is shallow, when a detection value of a tilling depth sensor of the rotary tilling device is shallow, information is transmitted from the control device 30 via a communication device to the work machine controller 310 provided in the work machine of the auxiliary moving work vehicle 100, and the depth adjustment actuator is operated so as to make the seedling depth shallow. Namely, the control is enabled in which the detection value of the sensor provided in the work machine of the autonomously moving work vehicle 1 or a control signal of the work machine controller 270 is transmitted via the communication line or the communication device to the work machine controller 310 provided in the work machine of the auxiliary moving work vehicle 100 so as to operate the actuator provided in the work machine. Namely, it can be configured that the detection means, the actuator and the work controller of the work machine attached to the autonomously moving work vehicle 1 can be communicated with the detection means, the actuator and the work controller of the work machine attached to the auxiliary moving work vehicle 100, and the actuator of one of the work machines of the autonomously moving work vehicle 1 and the work machine of the auxiliary moving work vehicle 100 is controlled corresponding to the detection value or command obtained from the other work machine.

Figure 8:
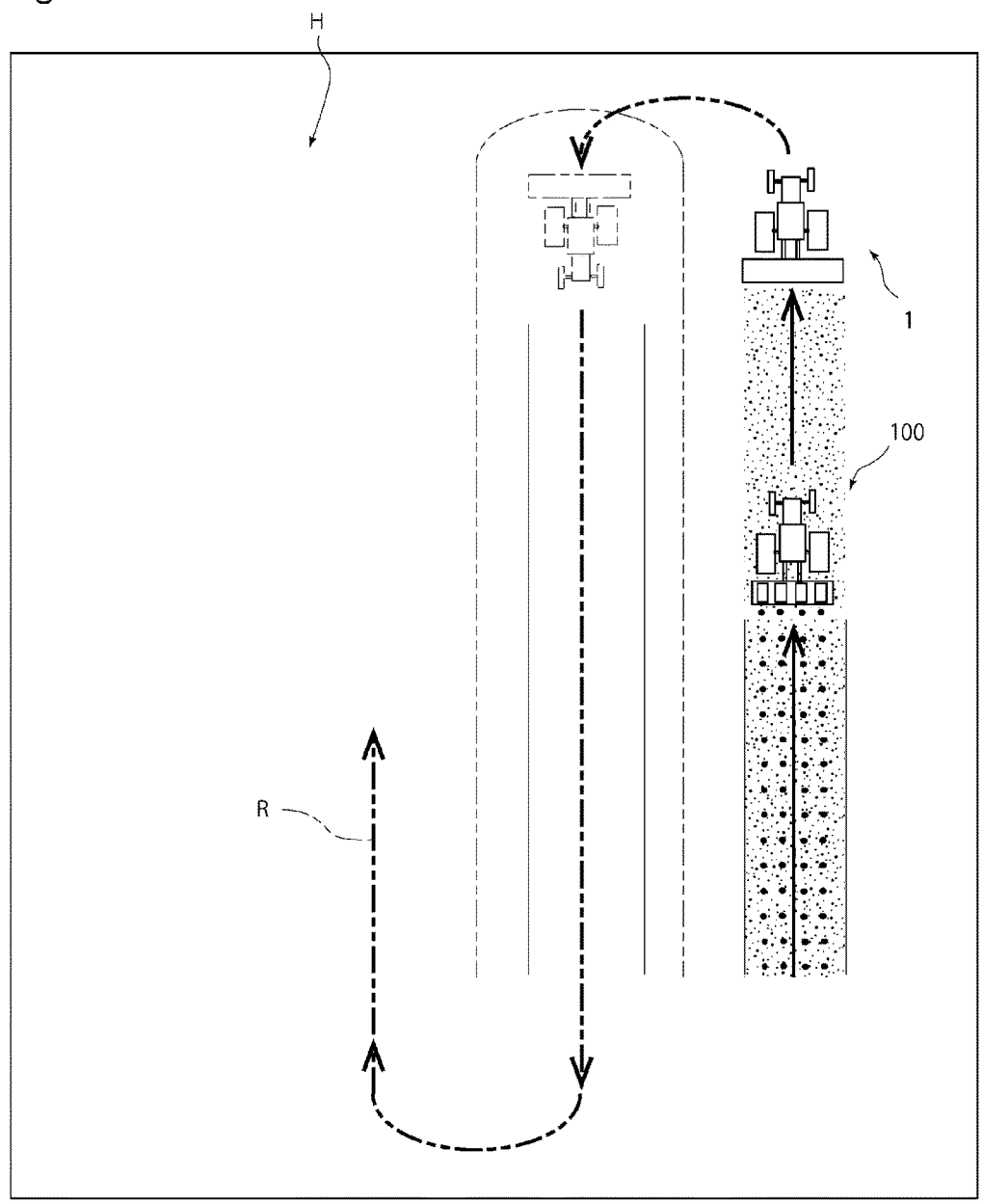
FIG. 8 is a drawing of the state of parallel traveling work in which a autonomously moving work vehicle and a auxiliary moving work vehicle travel while being aligned in a longitudinal direction.

The parallel traveling work of the autonomously moving work vehicle 1 and the auxiliary moving work vehicle 100 can be performed in the case in which the autonomously moving work vehicle 1 and the auxiliary moving work vehicle 100 perform different work while being aligned longitudinally as shown in FIG. 8. In this work, it can be configured that the detection means, the actuator and the work controller of the work machine attached to the autonomously moving work vehicle 1 can be communicated with the detection means, the actuator and the work controller of the work machine attached to the auxiliary moving work vehicle 100, and the actuator of one of the work machines of the autonomously moving work vehicle 1 and the work machine of the auxiliary moving work vehicle 100 is controlled corresponding to the detection value or command obtained from the other work machine. In this case, because a part of the autonomously moving work vehicle 1 overlaps a part of the auxiliary moving work vehicle 100 when the vehicles turn in adjacent rows, the turning is performed with an interval of one row at a butt.

By the above means, in the case in which the work is performed by the autonomously moving work vehicle 1 and the auxiliary moving work vehicle 100 while traveling in parallel, when the actuator of the auxiliary moving work vehicle 100 is controlled, the actuator of the autonomously moving work vehicle 1 is also controlled, and when the actuator of the autonomously moving work vehicle 1 is controlled, the actuator of the auxiliary moving work vehicle 100 is also controlled, whereby both the work machines thereof are controlled substantially simultaneously so that a uniform result can be obtained. When setting of one of the work machines is changed, the other work machine follows it, whereby setting work can be performed easily.

INDUSTRIAL APPLICABILITY

The present invention performs a plurality of work vehicles each of which is configured by attaching a work machine to a traveling vehicle and can be used for a constructive machine, an agricultural work vehicle and the like which can be operated remotely.

DESCRIPTION OF NOTATIONS 1 autonomously moving work vehicle
30 control device
34 mobile GPS antenna
60 engine controller
100 auxiliary moving work vehicle
112 remote control device

The invention claimed is:

1. A parallel travel work system, comprising:
a first work vehicle that is autonomously moving;
a second work vehicle that is manned by an operator;
a first satellite positioning system mounted on the first work vehicle; and
a second satellite positioning system, with lower accuracy than the first satellite positioning system, that is mounted on a remote control device that is configured to be carried on and positioned on the second work vehicle,
wherein the first work vehicle travels automatically along a set traveling route in a field,
wherein work is performed while the first work vehicle and the second work vehicle travel in parallel,
wherein an actual position of the first work vehicle is positioned by the first satellite positioning system and an actual position of the second work vehicle is positioned by the second satellite positioning system,
wherein the work and travel are performed while a separation distance is made within a set range, and the positions of the first work vehicle and the second work vehicle are displayed on a display device of the remote control device, and
wherein the separation distance is a distance between the first work vehicle and the second work vehicle in length or longitudinal directions of a path traveled by the first and second work vehicles traveling in parallel.

2. The parallel travel work system according to claim 1, wherein a control device of the remote control device calculates a distance between the first work vehicle and the second work vehicle and gives an alarm when the distance is not more than the separation distance.

3. The parallel travel work system according to claim 2, wherein the control device of the remote control device calculates the distance between the first work vehicle and the second work vehicle and gives an alarm when the distance is not less than the separation distance.

4. A parallel travel work system, comprising:
a first work vehicle that is autonomously moving;
a second work vehicle that is manned by an operator;
a first satellite positioning system mounted on the first work vehicle; and
a second satellite positioning system, with lower accuracy than the first satellite positioning system, that is mounted on a remote control device that is configured to be carried into and positioned on the second work vehicle,
wherein the first work vehicle travels automatically along a set traveling route in a field,
wherein work is performed while the first work vehicle and the second work vehicle travel in parallel,
wherein an actual position of the first work vehicle is positioned by the first satellite positioning system and an actual position of the second work vehicle is positioned by the second satellite positioning system, wherein the work and travel are performed while a separation distance is made within a set range, and the positions of the first work vehicle and the second work vehicle are displayed on a display device of the remote control device,
wherein the separation distance is a distance between the first work vehicle and the second work vehicle in length or longitudinal directions of a path traveled by the first and second work vehicles traveling in parallel, and
wherein the first satellite positioning system is a real time kinematic global positioning system (RTK-GPS) and the second satellite positioning system is a differential global positioning system (DGPS).

\* \* \* \* \*